US012534348B2

(12) United States Patent
Varanasi et al.

(10) Patent No.: US 12,534,348 B2

(45) Date of Patent: Jan. 27, 2026

(54) ARTICLE HANDLING SYSTEM

(71) Applicant: CHAIRMAN, DEFENCE RESEARCH & DEVELOPMENT ORGANISATION (DRDO), New Delhi (IN)

(72) Inventors: Rama Krishna Varanasi, Vishakhapatnam (IN); Obla Ramanandam Nandagopan, Vishakhapatnam (IN); Parikshith Mallya, Bangalore (IN); Uppada Urban Kumar, Vishakhapatnam (IN); Chandru Patreyya Kulkarni, Bangalore (IN)

(73) Assignee: Chairman, Defence Research & Development Organisation (DRDO), New Delhi (IN)

(*) Notice: Subject to any disclaimer, the term of this patent is extended or adjusted under 35 U.S.C. 154(b) by 369 days.

(21) Appl. No.: 18/029,214

(22) PCT Filed: Mar. 4, 2021

(86) PCT No.: PCT/IN2021/050208

§ 371 (c)(1),
(2) Date: Mar. 29, 2023

(87) PCT Pub. No.: WO2022/070203

PCT Pub. Date: Apr. 7, 2022

(65) Prior Publication Data

US 2023/0406680 A1 Dec. 21, 2023

(30) Foreign Application Priority Data

Oct. 1, 2020 (IN) ............................ 202011042842

(51) Int. Cl.
*B66F 9/065* (2006.01)
*B66F 7/06* (2006.01)

(52) U.S. Cl.
CPC ............ *B66F 9/065* (2013.01); *B66F 7/0683* (2013.01)

(58) Field of Classification Search
CPC .......... B66F 7/0683; B66F 7/065; B66F 7/22; B66F 9/18; B66F 9/183; B66F 9/185; B66F 9/19; B66F 9/195; B66C 23/80
(Continued)

(56) References Cited

U.S. PATENT DOCUMENTS 2,402,579 A * 6/1946 Ross ......................... B66F 7/08 182/69.5
2,896,909 A * 7/1959 Taylor ..................... B60P 1/025 280/43.23
(Continued)

FOREIGN PATENT DOCUMENTS

CN 104627899 B 6/2017
CN 109244903 A * 1/2019

*Primary Examiner* — Saul Rodriguez
*Assistant Examiner* — Brendan P Tighe
(74) *Attorney, Agent, or Firm* — DeLio Peterson & Curcio LLC; David R. Pegnataro

(57) ABSTRACT

An article handling system for a naval surface warfare vessel/ship comprises a lower frame and an upper frame interconnected by a plurality of scissor lift linkages. A plurality of drive units are configured to translate an article mounted article bed in an upward and a downward, a forward and a rearward, and a tilting translational degrees of freedom. Each of said drive units are configured to switch said article handling system from a retracted position to an extended operating position. The article handling system may be controlled manually or by a control unit or a handheld controller.

15 Claims, 7 Drawing Sheets

(58) Field of Classification Search
USPC .................................................. 414/589, 590
See application file for complete search history.

(56) References Cited

U.S. PATENT DOCUMENTS

| | | | | | |
|---|---|---|---|---|---|
| 4,522,548 | A * | 6/1985 | Oswald | B60P 3/00 | 414/458 |
| 5,083,892 | A * | 1/1992 | Oswald | B60P 3/00 | 414/458 |
| 5,379,855 | A * | 1/1995 | Juang | B66B 9/02 | 187/269 |
| 11,370,644 | B1 * | 6/2022 | Hamlik | B66F 9/205 | |
| 2002/0029930 | A1 * | 3/2002 | Bassett, Jr. | B66F 11/042 | 182/69.5 |
| 2003/0156501 | A1 * | 8/2003 | Spindel | G06K 19/07758 | 369/1 |
| 2006/0283669 | A1 * | 12/2006 | Patten | B66F 7/065 | 187/269 |
| 2007/0221895 | A1 * | 9/2007 | Pieger | B66F 7/0666 | 254/124 |
| 2008/0142464 | A1 * | 6/2008 | Fugel | E04G 21/0436 | 212/180 |
| 2016/0032602 | A1 * | 2/2016 | Fügel | B60S 9/02 | 248/49 |
| 2018/0212434 | A1 * | 7/2018 | McKernan | H04B 5/266 | |
| 2021/0122621 | A1 * | 4/2021 | Goncalves | B60L 50/50 | |

* cited by examiner

ARTICLE HANDLING SYSTEM

BACKGROUND OF THE INVENTION

1. Field of the Invention

The present invention relates to an article handling system for a naval surface warfare vessel/ship.

2. Description of Related Art

Generally, the launching process of torpedoes from a naval vessel/ship may be categorized into: underwater tubes/launchers for a submarine, and deck mounted launchers installed onboard the surface of the vessels/ships. A torpedo tube/launcher is typically a cylindrically-shaped device into which a torpedo is loaded before initiating the launching process. The torpedo loading procedure for a submarine-based launching process is pre-defined due to its confined environment and underwater limitation. The torpedo loading procedure for deck mounted onboard surface launchers which are open to the atmosphere is a challenging process, dependent and effected by many factors that include surrounding objects and roll/pitch/yaw rates of the vessel/ship.

Currently, a manually-operated hydraulic lift machine with a minimum of 8 to 10 manpower assistance loads the torpedoes into the deck mounted onboard surface launchers. Space constraints on the surface of the ship/vessel are a limitation for such loading process. Also, when sailing in the middle of the sea, there is a limitation of stability due to roll and pitch scenarios of the ship/vessel and it is difficult to load the torpedo into the launcher without damaging its outer surface. The torpedo launching trail rate in such operational scenarios is significantly low.

Therefore, there is a need to provide a system that obviates and overcomes one or more of the aforementioned problems.

SUMMARY OF THE INVENTION

This summary is provided to introduce concepts related to an article handling system. This summary is neither intended to identify essential features of the present invention nor is it intended for use in determining or limiting the scope of the present invention.

Accordingly, an aspect of the present invention discloses an article handling system comprising a lower frame and an upper frame interconnected by a plurality of scissor lift linkages at a proximal end and a distal end of said lower and upper frames, each said scissor lift linkage having a pivotable first arm and a pivotable second arm, each pivotable arm having a first end and a second end; a first supporting frame having a plurality of pivotable linking arms for coupling with said plurality of scissor lift linkages, said first supporting frame disposed intermediate said lower and upper frames; an article bed mounted on a second supporting frame coupled to said upper frame, said article bed having a plurality of multi-directional rollers disposed on oppositely lying sides of said article bed, each said multi-directional roller configured for linear and rotational motion of said article; a first drive unit mounted on said first supporting frame and configured to translate said article bed interconnected with said plurality of scissor lift linkages and said upper frame about a longitudinal axis in an upward and a downward translational degree of freedom; a second drive unit coupled to said article bed and configured to translate said article about an axial feed axis perpendicular to said longitudinal axis of said first drive unit in a forward and a rearward translational degree of freedom; and a third drive unit coupled to said article bed and configured to translate said article bed about an angular pitch axis in a tilting translational degree of freedom, each of said drive units configured to switch said article handling system mounted on a base/ship platform from a retracted position to an extended operating position, thereby stabilizing translation of said article and ensuring protection to an outer surface of said article.

BRIEF DESCRIPTION OF THE DRAWINGS

The above and other aspects, features, and advantages of certain exemplary embodiments of the present invention will be more apparent from the following description taken in conjunction with the accompanying drawings in which.

Figure 1:
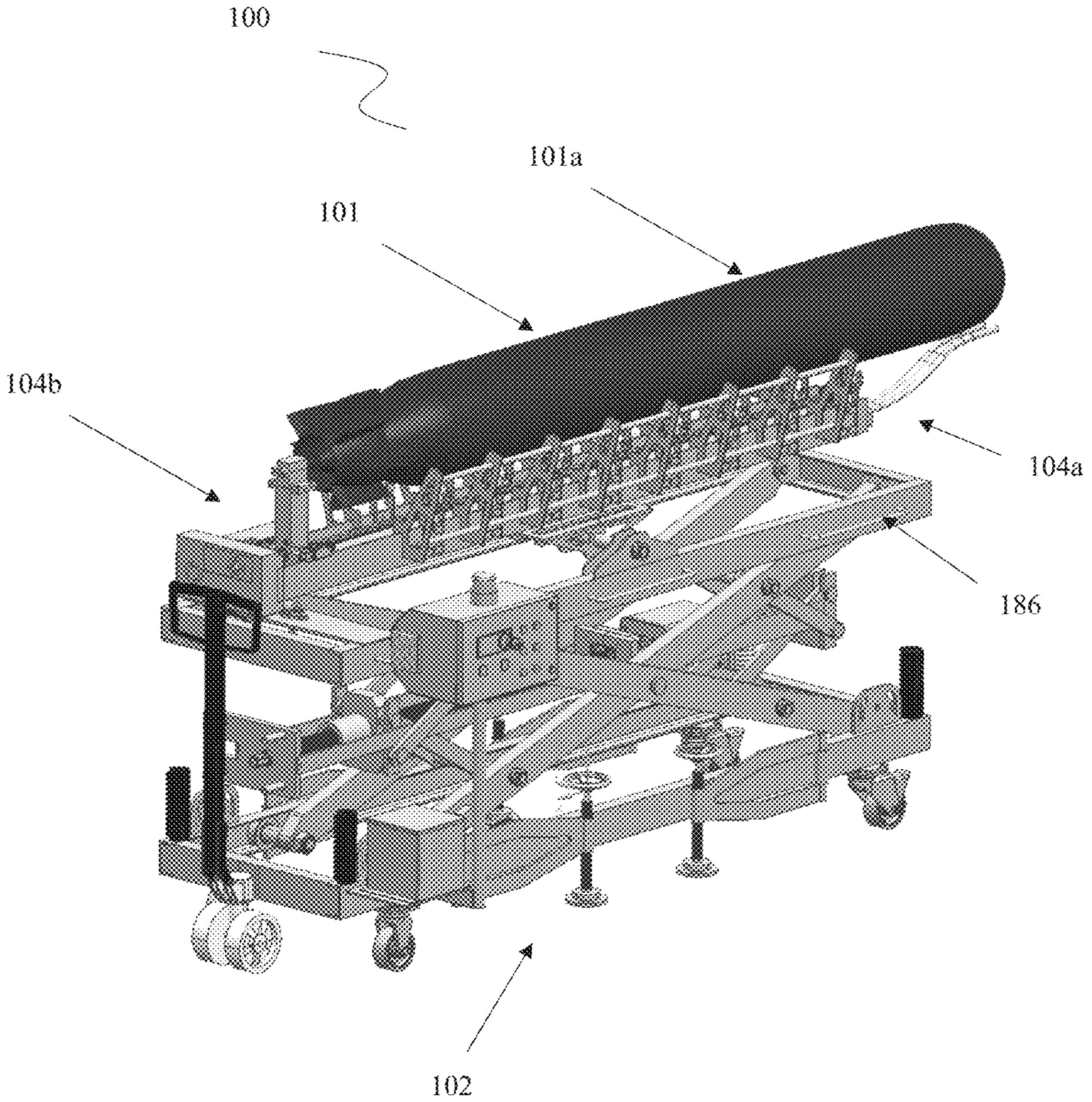
FIG. 1 illustrates an isometric view of an article handling system, according to an aspect of the present invention.
Figure 2A:
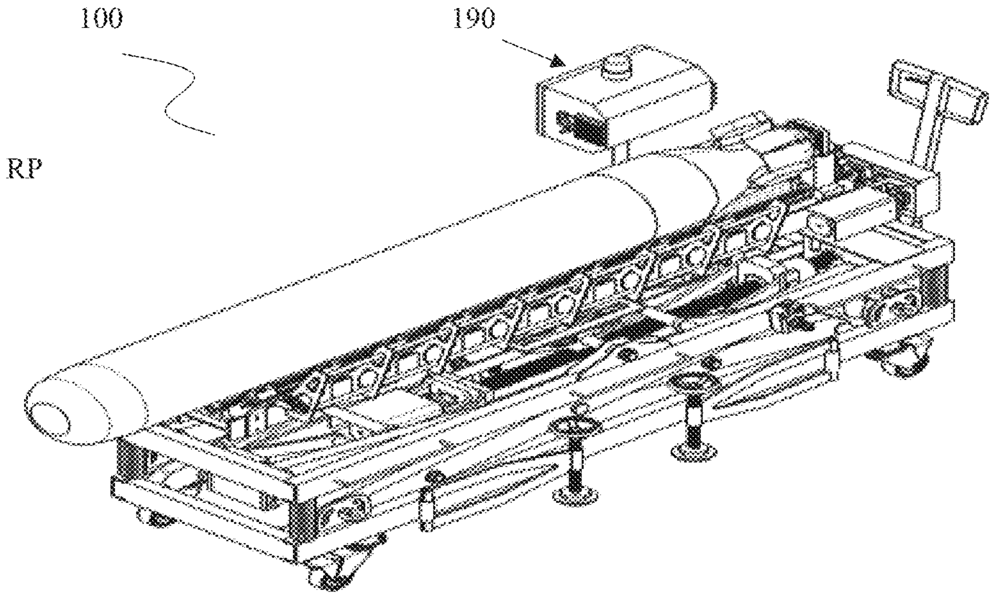
FIGS. 2A and 2B illustrate an isometric view and front view, respectively, of the article handling system in a retracted position, according to an embodiment of the present invention.
Figure 2B:
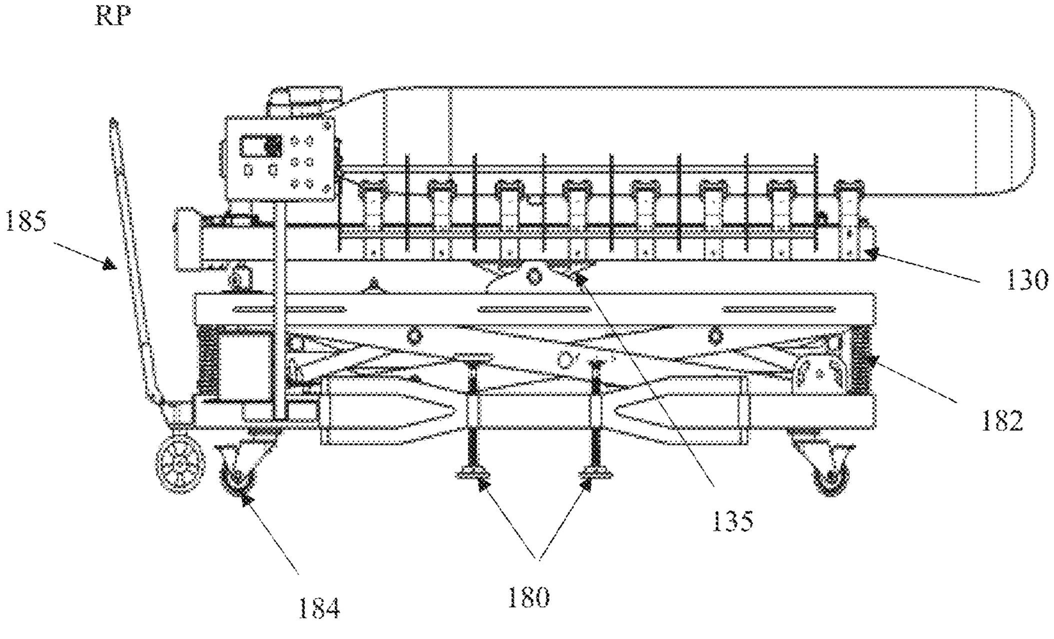
Figure 3A:
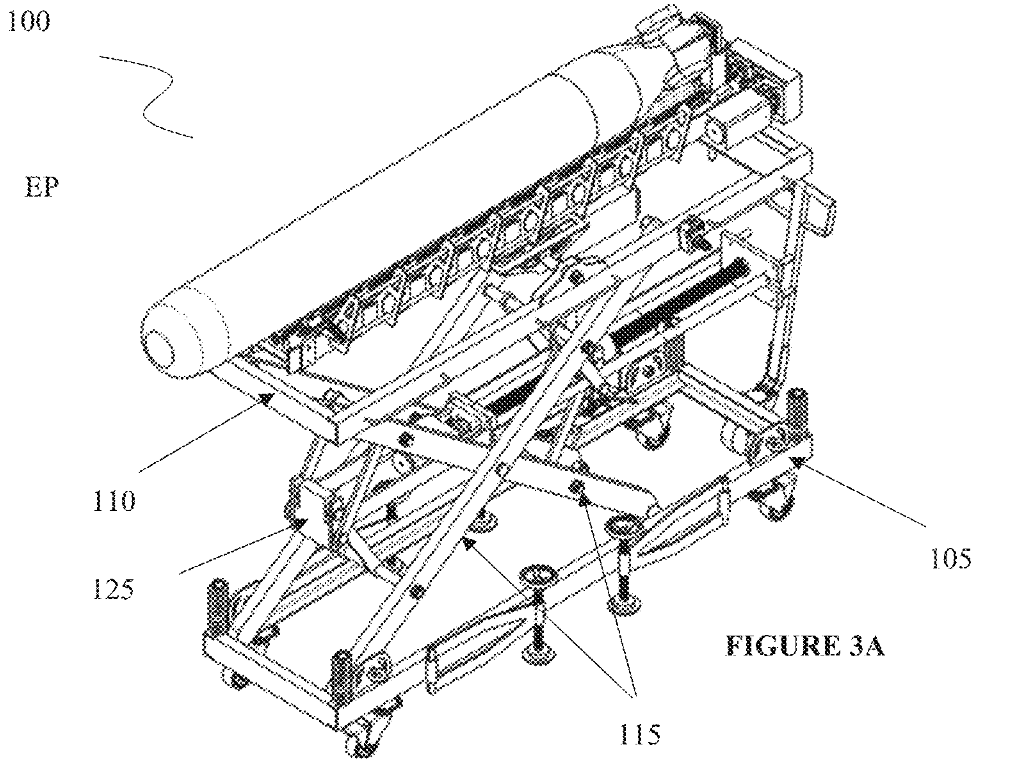
FIGS. 3A and 3B illustrate an isometric view and front view, respectively, of the article handling system of FIGS. 2A and 2B in an extended operating position, according to the embodiment of the present invention.
Figure 3B:
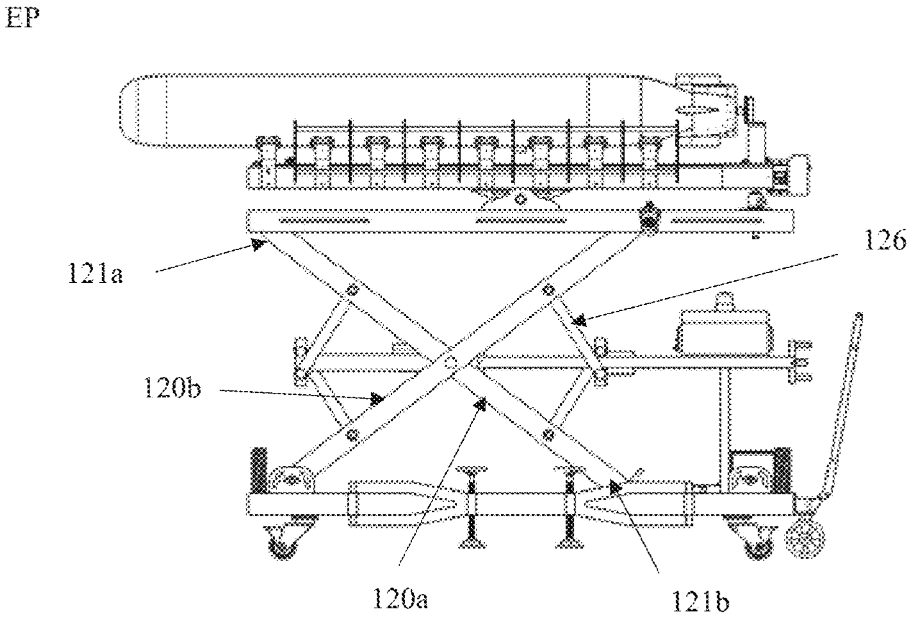

Persons skilled in the art will appreciate that elements in the figures are illustrated for simplicity and clarity and may have not been drawn to scale. For example, the dimensions of some of the elements in the figures may be exaggerated relative to other elements to help to improve understanding of various exemplary embodiments of the present disclosure.

Throughout the drawings, it should be noted that like reference numbers may be used to depict the same or similar elements, features, and structures.

DESCRIPTION OF THE EMBODIMENT(S)

In describing the embodiments of the present invention, reference will be made herein to FIGS. 1-8B of the drawings, in which like numerals refer to like features of the invention.

Certain terminology is used herein for convenience only and is not to be taken as a limitation of the invention. For example, words such as "upper," "lower," "left," "right," "horizontal," "vertical," "upward," "downward," "clockwise," "counterclockwise," "longitudinal," "lateral," or "radial" merely describe the configuration shown in the drawings. Indeed, the referenced components may be oriented in any direction and the terminology, therefore, should be understood as encompassing such variations unless specified otherwise. For purposes of clarity, the same reference numbers may be used in the drawings to identify similar elements.

Additionally, in the subject description, the words “exemplary,” “illustrative,” or the like are used to mean serving as an example, instance, or illustration. Any aspect or design described herein as “exemplary” or “illustrative” is not necessarily intended to be construed as preferred or advantageous over other aspects or design. Rather, the use of the words “exemplary” or “illustrative” is merely intended to present concepts in a concrete fashion.

In the following description, for the purpose of explanation, specific details are set forth in order to provide an understanding of the present invention. It will be apparent, however, to one skilled in the art that the present invention may be practiced without these details. One skilled in the art will recognize that embodiments of the present invention, some of which are described below, may be incorporated into a number of systems.

In general, the present invention discloses an article handling system for a naval surface warfare vessel/ship. The article handling system comprises a lower frame and an upper frame interconnected by a plurality of scissor lift linkages, a first supporting frame disposed intermediate said lower and upper frames and coupled to said plurality of scissor lift linkages, an article bed mounted on a second supporting frame coupled to said upper frame, and a plurality of drive units configured to translate said article bed in an upward and a downward, a forward and a rearward, and a tilting translational degrees of freedom, respectively, each of said drive units configured to switch said article handling system mounted on a base/ship platform from a retracted position to an extended operating position, thereby stabilizing translation of said article and ensuring protection to an outer surface of said article. The article handling system may be controlled manually or by a control unit or a handheld controller.

Other aspects, advantages, and salient features of the invention will become apparent to those skilled in the art from the following detailed description, which, taken in conjunction with the annexed drawings, discloses exemplary embodiments of the invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents. The skilled person will be able devise various arrangements that, although not explicitly described herein, embody the principles of the present invention. All the terms and expressions in the description are only for the purpose of the understanding and nowhere limit the invention. Accordingly, those of ordinary skill in the art will recognize that various changes and modifications of the embodiments described herein can be made without departing from the scope and spirit of the invention. In addition, descriptions of well-known functions and constructions are omitted for clarity and conciseness. Terms such as first, second, top, bottom, upper, lower, and the like, are used to differentiate between objects having the same terminology and are in no way intended to represent a chronological order, unless where explicitly stated otherwise. Moreover, all statements herein reciting principles, aspects, and embodiments of the invention, as well as specific examples thereof, are intended to encompass equivalents thereof.

FIGS. 1-8B illustrate, and are not limited to, an article (101) handling system (100), outer surface (101*a*) of article, a base/ship platform (102), a proximal end (104*a*), a distal end (104*b*), a lower frame (105), an upper frame (110), a plurality of scissor lift linkages (115), a pivotable first arm (120*a*) and a pivotable second arm (120*b*), a first end (121*a*), a second end (121*b*), a first supporting frame (125), a plurality of linking arms (126), an article bed (130), a second supporting frame (135), plurality of multi-directional rollers (136), a first drive unit (140), a planetary geared bipolar stepper motor (142), a ball screw linear actuator (144), jaw clutch (145), a winch (146), a rotating handle (148), a second drive unit (150), a planetary geared bipolar stepper motor (152), ball screw linear actuator (154), jaw clutch (155), a chain drive (156), a first hand-wheel (158), a third drive unit (160), a cubical worm gear screw jack (164), a power screwdriver (not shown), a second hand-wheel (165), a torque wrench (not shown), retracted position (RP), extended operating position (EP), control unit (170*a*), hand-held controller (170*b*), a power source (171), a plurality of power supply limit switches (172), a plurality of power cables (173), a user interface (174), a display interface (175), memory (176), a processor or micro-controller (178), a control panel (190), a plurality of support legs (180), a plurality of suspension members (182), a plurality of wheels (184), a towing handle (185), a plurality of user engagement holders (186), and a plurality of retraction plates (188).

Referring now to FIGS. 1-3B, various views of an article handling system (100) according to the present invention, in a retracted position (RP) and an extended operating position (EP), respectively, are illustrated. The article (101), hereinafter a torpedo as an exemplary embodiment, must be loaded inside a torpedo launcher before launching from a naval surface warfare vessel/ship. The article handling system (100) may be used as an assistive device for the torpedo launcher such that launching trails rates are increased, the manpower requirement to perform the loading process into the launcher is reduced, and the outer surface of the torpedo during the loading process is safeguarded.

According to an embodiment of the present invention, non-limiting features of the article handling system (100) include a lifting height of 1200 mm, a maximum load handling capacity of 450 kg, an overall length and a width of 2600 mm×720 mm, a closed height of 620 mm, and an open height of 1620 mm from a lower frame having C-channels. In the system (100), a plurality of automatic drives, each configured with a stepper motor coupled to respective drive units, aid in translating said system from said retracted position (RP) to said extended operating position (EP). A first stepper motor is configured for operation of a scissor lift. The first stepper motor raises and lowers the scissor lift from about 0 mm to 1200 mm and vice versa. A second stepper motor is configured for linear motion of a torpedo such that the torpedo is inserted into the torpedo tube/launcher. Stepper motors have the highest torque and have a minimum angular moment of 1.8 deg. The application of stepper motors is also advantageous to avoid complex VFD drive phenomenon, thereby the total cost of the system is significantly reduced. A third degree of freedom of the system is angular motion/tilt of the torpedo bed and is configured with the aid of a power screwdriver. In an embodiment, a maximum tilting of torpedo bed from 0 to ±2 degrees is made possible; however, it should be understood by those skilled in the art that a larger range of motion is not intended to be precluded.

According to an aspect, the present invention discloses an article handling system (100) comprising a lower frame (105) and an upper frame (110) interconnected by a plurality of scissor lift linkages (115) at a proximal end (104*a*) and a distal end (104*b*) of said lower (105) and upper (110) frames. Each said scissor lift linkage (115) has a pivotable first arm (120*a*) and a pivotable second arm (120*b*). Each pivotable arm (120*a*, 120*b*) has a first end (121*a*) and a second end (121*b*).

According to an embodiment, a plurality of drive units (140, 150, 160) are configured to switch said article handling system (100) mounted on a base/ship platform (102) from a retracted position (RP) to an extended operating position (EP), thereby stabilizing translation of said article (101) and ensuring protection to an outer surface (101*a*) of said article (101).

According to an embodiment, said first end (121*a*) or second end (121*b*) of said pivotable first (120*a*) and second (120*b*) arms is slidable along an axial plane within said lower (105) and upper (110) frames when said article handling system (100) is switched from said retracted position (RP) to said extended operating position (EP).

According to an embodiment, said lower frame (105) includes a plurality of support legs (180) configured to extended about 130 degrees for stabilizing translation of said article (101) at more than 25 degrees at a pitch condition of said base/ship platform (102). A plurality of suspension members (182) are disposed on said lower frame (105) for receiving absorbing load of the article (101) in said retracted position (RP). A plurality of wheels (184) and a towing handle (185) are coupled to said lower frame (105), and a plurality of user engagement holders (186) are coupled to said lower (105) and upper frame (110) for maneuvering and transporting article handling system (100).

According to embodiments of the present invention, the system is sturdy, and stability of system (100) is qualified for necessary ship roll criteria. In at least one embodiment, at least 4 supporting arms/Jibs (180) are provided to increase stability. According to an exemplary embodiment, a stability analysis is carried out for the system (100) in pitch axis when the scissor lift (115) is at fully lifted condition with torpedo (101) placed on the support bed (130) to load inside the launcher. Accordingly, base/ship platform (102) of system is tilted up to 30 degree and the horizontal distance is measured from system CG to supporting arm end until the distance reduces to zero. The results disclose system (100) with good stability in ship roll criteria.

Figure 4A:
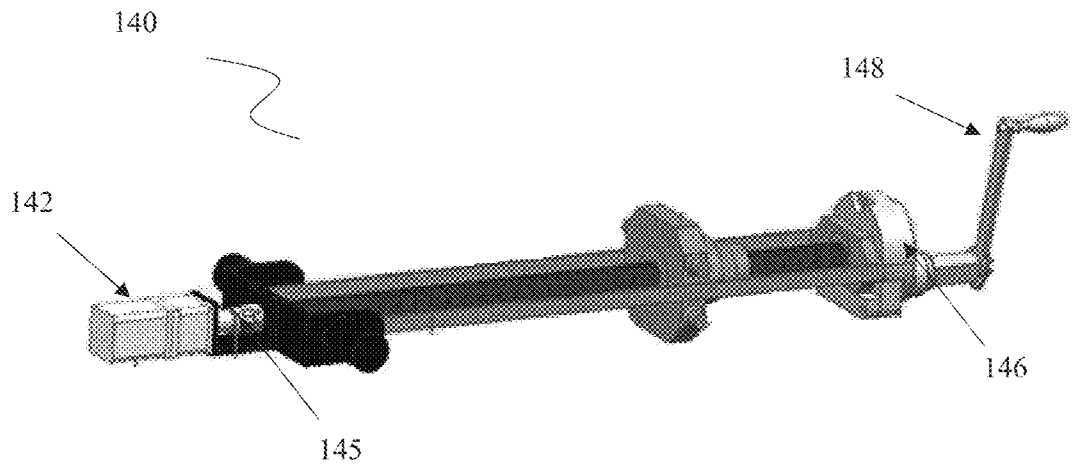
FIGS. 4A and 4B illustrate isometric views of a first drive unit and a first support frame, respectively, according to an embodiment of the present invention.
Figure 4B:
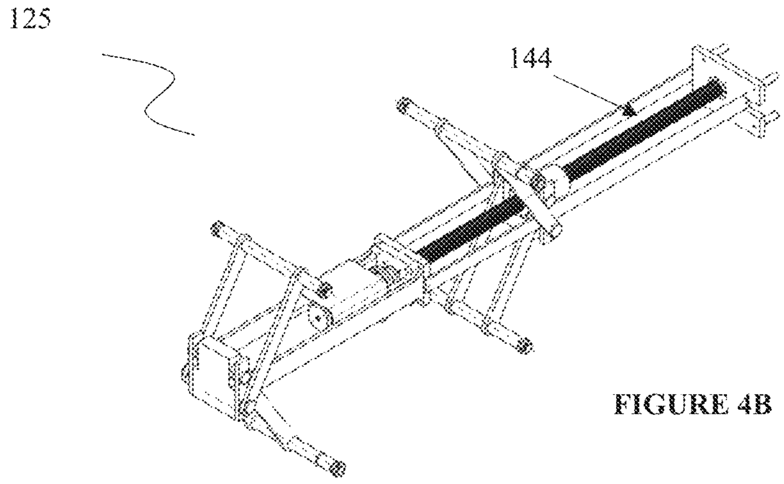

Referring now to FIGS. 4A-4B, along with FIGS. 1-3B, a detailed view of a first drive unit (140), and a first support frame (125) according to an embodiment of the present invention is illustrated. According to the embodiment shown, a first drive unit (140) is mounted on said first supporting frame (125) and configured to translate said article bed (130) interconnected with said plurality of scissor lift linkages (115) and said upper frame (110), about a longitudinal axis in an upward and a downward translational degree of freedom. According to the embodiment, said first supporting frame (125) has a plurality of pivotable linking arms (126) for coupling with said plurality of scissor lift linkages (115), said first supporting frame (125) disposed intermediate said lower (105) and upper (110) frames.

According to the embodiment, in an automatic mode said first drive unit (140) includes a planetary geared bipolar stepper motor (142) coupled to a ball screw linear actuator (144) via an interconnected jaw clutch (145) for transmitting power and translating said article bed (130) in said upwards and downwards translational degree of freedom. In manual override mode, said first drive unit (140) includes a winch (146) having a rotating handle (148) coupled to said ball screw linear actuator (144) for manually translating said article bed (130) in said upwards and downwards translational degree of freedom, when said jaw clutch (145) is disengaged from said ball screw linear actuator (144).

According to the embodiment, ball screws come in two basic configurations—rotating screw (S) and rotating nut (N). Rotating screw assemblies actuate by having the motor rotate a lead screw and translate a load that is attached to the lead nut. Motion is achieved by constraining the motor and translating a load attached to the lead screw or constraining the lead screw and translating a load attached to the motor. Upwards and downwards translational degree of freedom is achieved by means of lead screw rod with 2HP motor stepper motor assembly. Scissor lift with said first drive unit (140) in automatic mode has direct drive from motor (142) shaft to lead screw rod via a jaw clutch (145). Whenever the motor is working on electric current, the handle (148) of manual winch (146) is dismantled and stored in a tool kit.

According to the embodiment, during the power down, as the power supply to the system (100) is not available the system is shifted to a manual override mode. A custom-made winch (146) is mounted to the end of ball screw assembly (144) using fasteners. By loosening the fasteners of jaw clutch (145), power transmission from motor (142) to ball screw rod will be disengaged. Manual operating handle (148) is assembled to winch (146) by press fit. Rotation of the manual winch handle (148) creates the power transmission to ball screw rod (144), this manual rotating motion of ball screw rod operates upwards and downwards translational degree of freedom of the article bed (130). Thus, the system is manually operated with ease of equipment handling and efficient power transmission from motor to ball screw. After the completion of operation, the process of mounting and disengagement is reversed for the regular use of the system (100) with power supply.

Figure 5A:
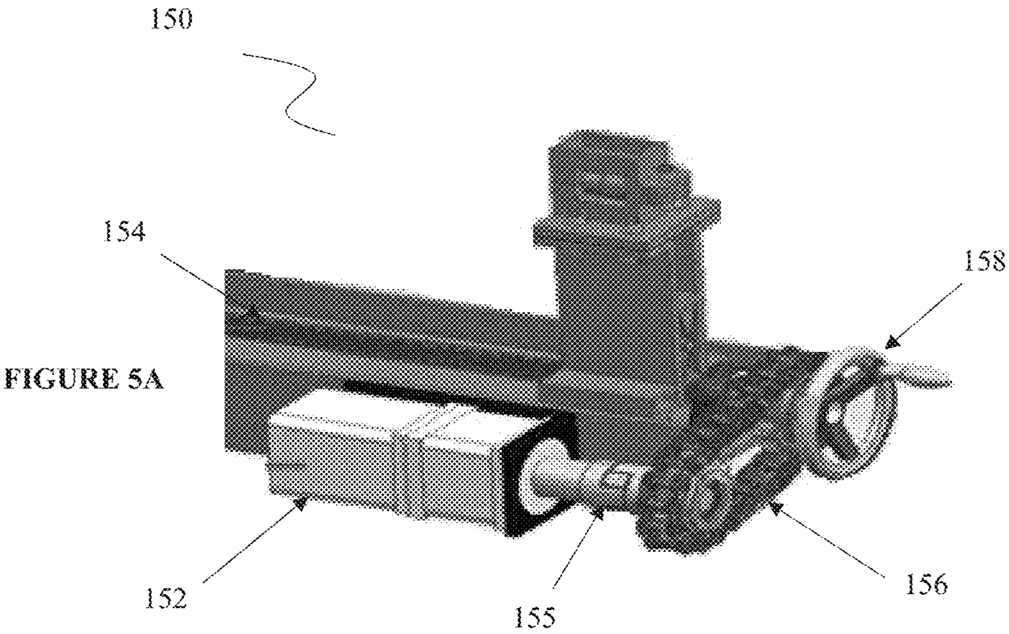
FIGS. 5A and 5B illustrate isometric views of a second drive unit and an article bed, respectively, according to an embodiment of the present invention.
Figure 5B:
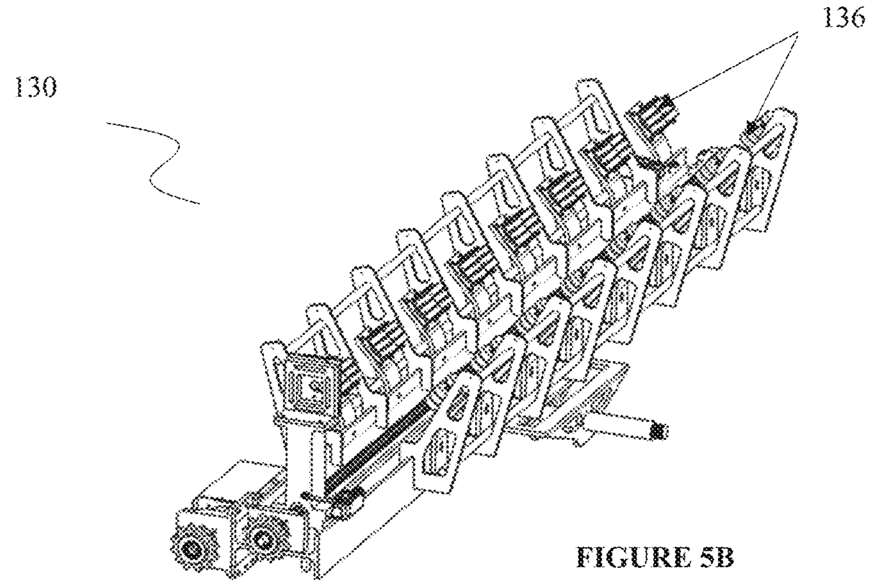

Referring now to FIGS. 5A-5B, along with FIGS. 1-3B, a detailed view of a second drive unit (150) according to an embodiment of the present invention is illustrated. According to the embodiment, a second drive unit (150) is coupled to said article bed (130) and configured to translate said article (101) about an axial feed axis perpendicular to said longitudinal axis of said first drive unit (140), in a forward and a rearward translational degree of freedom. According to the embodiment, an article bed (130) is mounted on a second supporting frame (135) coupled to said upper frame (110), said article bed (130) having a plurality of multi-directional rollers (136) disposed on oppositely lying sides of said article bed (130), each said multi-directional roller (136) configured for linear and rotational motion of said article (101). As shown, 8 pair of multi directional rollers have been used for each side, and therefore a total of 16 rollers translate said article in a linear motion. It should be understood by those skilled in the art that the present invention is not limited to a total of 16 rollers and that the use of any other number of rollers sufficient to translate said article in a linear motion is not precluded.

According to the embodiment, in an automatic mode said second drive unit (150) includes a planetary geared bipolar stepper motor (152) coupled to a ball screw linear actuator (154) via an interconnected j aw clutch (155) and a chain drive (156) for transmitting power and translating said article (101) in said forward and rearward translational degree of freedom. In manual override mode, said second drive unit (150) includes a first hand-wheel (158) coupled to said ball screw linear actuator (154) for manually translating said article (101) in said forward and rearward translational degree of freedom, when said jaw clutch (155) is disengaged from said ball screw linear actuator (154). According to the present invention, the second drive unit, during power supply automatic mode, has power transmission from motor (152) to ball screw rod via chain drive (156) by engaging the jaw clutch with driven chain sprocket by tightening and loosening the fasteners of jaw clutch (155). Output shaft of motor (152) is connected to drive chain (156) sprocket and lead screw is connected with driven gear sprocket. Whenever the motor is working on electric current, the first hand-wheel (158) used for driven gear is dismantled and stored in a tool kit. During a power down scenario, jaw clutch (155) fasteners are loosened, by this the connection between motor (152) and ball screw rod (154) is disengaged. Rotating the socket bit mounted on the tail of ball screw (154) with a spanner or first hand-wheel (158) manual operation of forward and rearward translational degree of freedom is achieved. After the completion of operation, the process of mounting and disengagement is reversed for the regular use of the system (100) with power supply.

Figure 6:
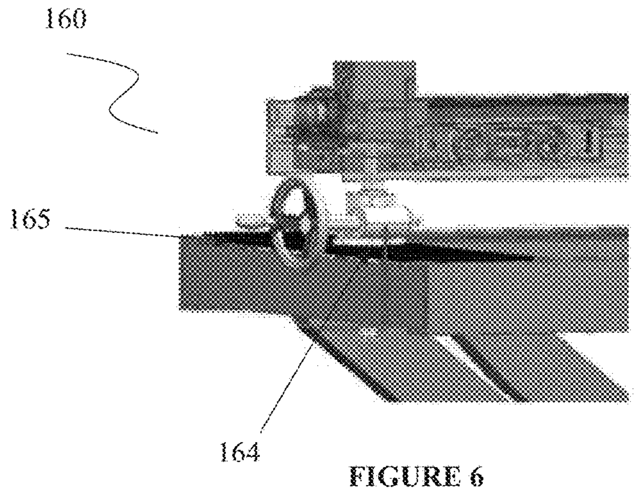
FIG. 6 illustrates a detailed view of a third drive unit, according to an embodiment of the present invention.

Referring now to FIG. 6, along with FIGS. 1-3B, a detailed view of a third drive unit according to an embodiment of the present invention is illustrated. According to the embodiment, a third drive unit (160) is coupled to said article bed (130) and configured to translate said article bed (130) about an angular pitch axis in a tilting translational degree of freedom. According to the embodiment, in an automatic mode, third drive (160) unit includes a cubical worm gear screw jack (164) interconnected to a power screwdriver and coupled to said article bed (130) for controlling angular pitch position of the said article bed (130) to about 0 to ±2 tilting translational degree of freedom. In a manual override mode, third drive unit (160) includes a second hand-wheel (165) or a torque wrench for coupling to said cubical worm gear screw jack (164) for manually controlling angular pitch position of the said article bed (130) about said tilting translational degree of freedom, when said power screwdriver is disengaged from said cubical worm gear screw jack (164).

According to the embodiment, cubical worm gear screw jack (164) is operated with automatic portable screw driver (not shown), in any case of discharge of power of screw jack lowers, a torque wrench (not shown), or a second hand-wheel (165) is used in place of automatic portable screw driver. During power down condition, the portable screwdriver is dismantled from the screw jack and two extension bits are assembled to worm gear jack (164). Rotation of socket bits with the help of torque wrench or a second hand-wheel (165) allows the angular or tilt motion of torpedo. Rotation of second hand-wheel (165) in clockwise and counterclockwise directions forces the head of jack (164) to move in upward and downward directions, respectively, which forces torpedo bed to tilt in respective degrees which helps to align the torpedo bed (130) for loading of torpedo bed. After the completion of operation, the process of mounting and disengagement is reversed for the regular use of system (100) with automatic portable screwdriver.

Figure 7:
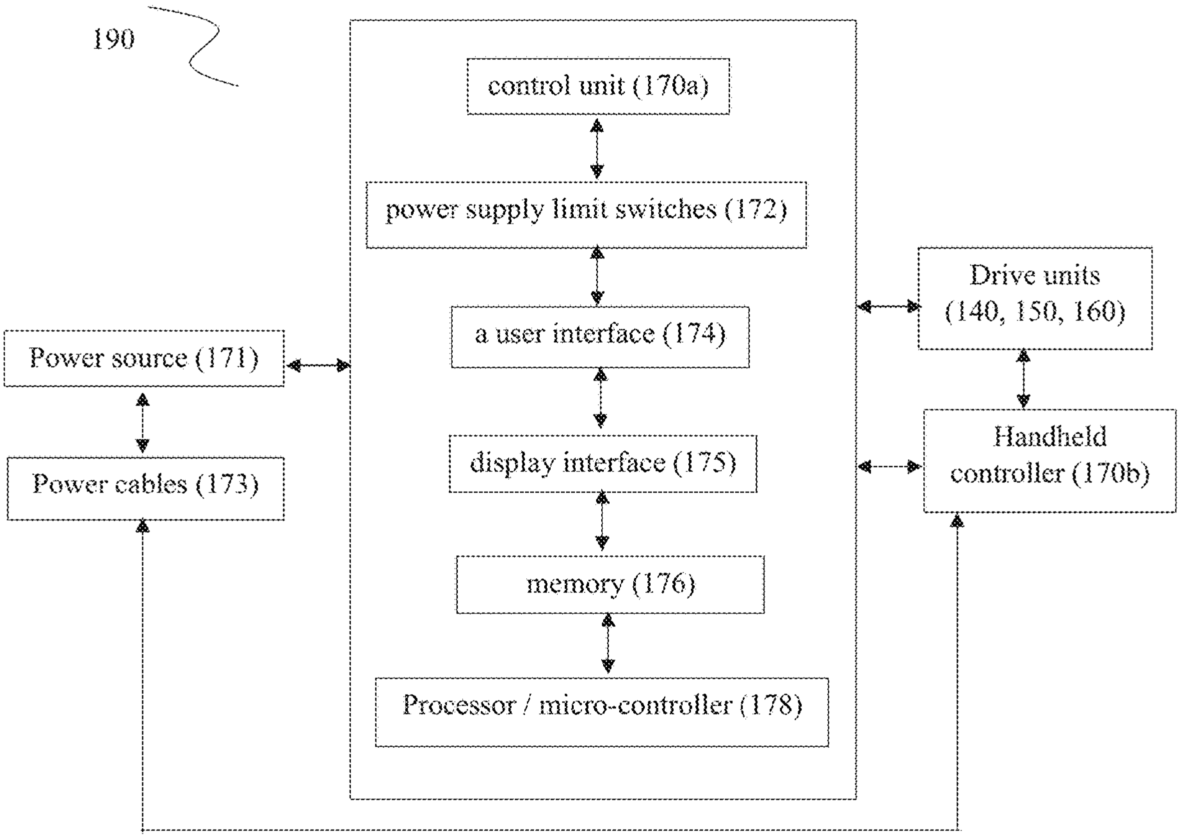
FIG. 7 illustrates a block diagram of a control unit, according to an embodiment of the present invention.

FIG. 7 illustrates a block diagram of a control panel (190) according to an embodiment of the present invention. According to at least one embodiment of the present invention, said first (140), second (150) and third drive (160) units are in electrical communication with a control unit (170*a*) mounted off-set to said article handling system (100) or with a handheld controller (170*b*). The control unit (170*a*) is within the control panel (190). The operation of both the controllers (170*a*, 170*b*) are mutually exclusive. Control unit (170*a*) acts as a master hub for power supply switching and motor driving electronics, the handheld controller (170*b*) may be operated from 3 meters away from the system (100) thereby providing the ability to the operator to move independently. The switching between two controllers can be done via a switch provided on control unit (170*a*). At any given moment, only one controller will be active.

According to an embodiment, said control unit (170*a*) or handheld controller (170*b*) includes a user interface (174), a display interface (175), a memory (176), and a processor or micro-controller (178), and in real-time is configured to: regulate power supply from a power source (171) to said article handling system (100); invoke a signal indicative of start of operation; actuate said drive (140, 150, 160) units based on command control signal inputs received from a user finger movement or joystick; trigger ON/OFF signal indicative of execution of transmitted said command control signals to said drive units (140, 150, 160); trigger ON/OFF signal indicative of feedback signals from said power supply limit switches (172); and enable a user to switch between said control unit (170*a*) or handheld controller (170*b*).

According to an embodiment, the system (100) includes four limit switches to restrict motion along horizontal and vertical axes, the limit switches (172) operate in normally Open (NO) condition. The plurality of power supply limit switches (172) are configured to said first (140), second (150) and third drive (160) units for sensing and locking position of said article (101) within a threshold position during said upwards/downwards, forwards/rearwards, and angular pitch translational degrees of freedom, respectively.

According to at least one embodiment, two bipolar stepper motors are used to achieve the vertical and horizontal motion of the payload. A bipolar stepper motor has one winding per stator phase. A two-phase bipolar stepper motor will have 4 leads. In a bipolar stepper motor, a common lead is not available, unlike in a unipolar stepper motor. Hence, there is no natural reversal of current direction through the winding. The bipolar stepper motor has easy wiring arrangement, but its operation is slightly complex. To drive a bipolar stepper motor, an H-bridge arrangement is provided, hence a separate motor driving unit is necessary so that it can be controlled via micro controller or processor.

According to an exemplary embodiment, the operating voltage for stepper motor and each driver unit are 72 VDC but power supply available on ship/vessel is 230 VAC, hence transformer based AC-to-DC converter adapted to the system (100) to convert 230 VAC to 72 VDC. Two output independent ports capable of supplying 6A, one Stepper driver connected to each port is provided within the system. During operation, a rotating light indicates that the control unit (170*a*) is "ON" i.e., the control unit is read to be operated. Light indicators provided on the control unit panel (190) indicate if system (100) has reached extreme and if upper/lower limit switches are triggered. Similarly, light indicators are provided on the control panel to indicate extremes and if in horizontal, axis limit switches are triggered. The control unit panel (190) also includes indicators and a user input provision to switch and to convey user if the control mechanism is by control unit (170*a*) or by handheld controller (170*b*) and which controller operates the motors. A 2-axis joystick is provided on the control unit to control movement along horizontal and vertical axis. The joystick is enabled only when a key switch on the topmost part of the joystick is pressed. The control unit panel (190) also includes input/user interface (174) and output port/display (175) which houses various cables (173) connecting motors, power supply limit switches etc.

Figure 8A:
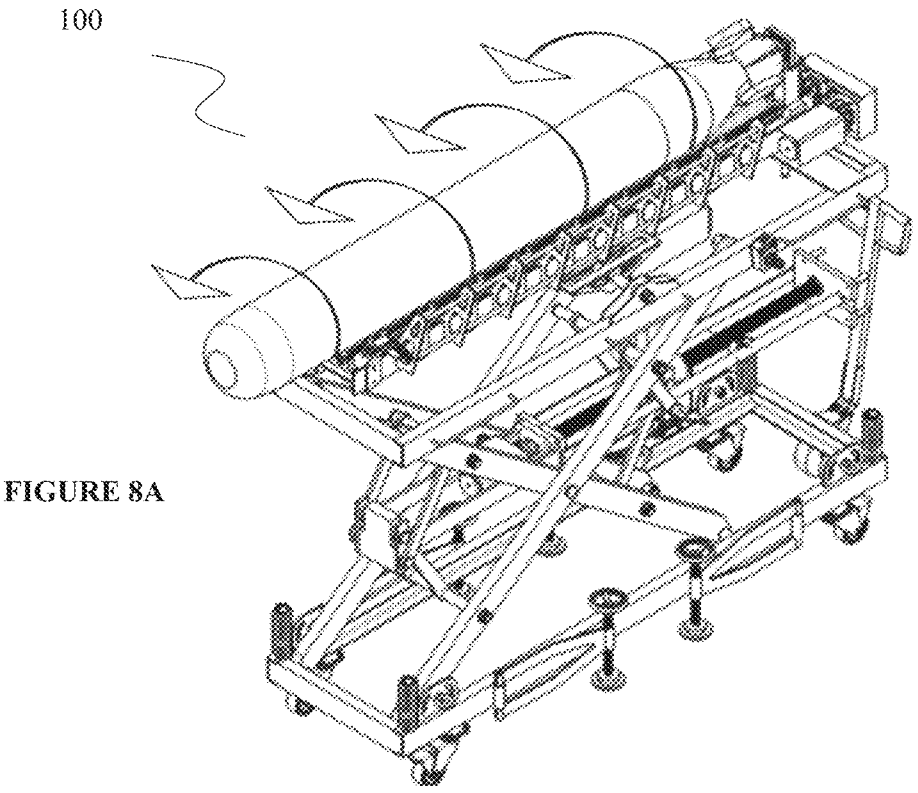
FIGS. 8A and 8B illustrate isometric views of an article handling system, showing rotation or roll of the article and a plurality of retraction plates, according to an embodiment of the present invention.
Figure 8B:
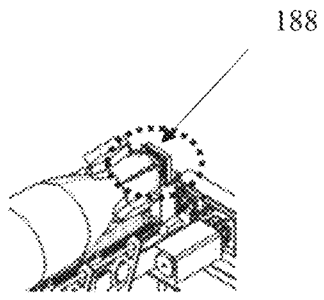

FIGS. 8A-8B illustrate an isometric view of an article handling system (100), showing rotation or roll of the article (101) and a plurality of retraction plates (188) according to an embodiment of the present invention. In an exemplary embodiment, the article (such as a torpedo) is loaded into the launcher. When the Article Handling System (100) is at fully extended forward position (EP) then the article (101) is pushed inside the launcher using second (150) and third drive (160) units. Before loading the article into the launcher, the article is placed on the torpedo bed and multi directional omni wheels/rollers are rolled single-handedly to align its scoop to the launcher's scoop slot for inserting the article safely into the launcher. This is the reference point used for the alignment of the article to launcher without scratch. In a practical scenario, if torpedo launching is called off due to some reason, the article is to be retracted or extracted the unfired article out from the launcher. A plurality of retraction plates (188) are coupled with second drive unit (150) to assemble with the article's (101) backside and then system (100) is rotated backwards for safe landing on the multi directional omni wheels/rollers of the torpedo bed. The time and effort taken for manually loading/retraction is significantly reduced. According to the embodiment, the Article Handling System (100) is provided with leveling carters (bottom wheels) (184) that have the provision to move the Article Handling System (100) with article (101) from one place to other and provision to lock the complete system (100) to avoid further movement.

There have been described and illustrated herein several embodiments of an article handling system. While particular embodiments of the invention have been described, it is not intended that the invention be limited thereto, as it is intended that the invention be as broad in scope as the art will allow and that the specification be read likewise. The type of materials for components and the components, are not limited to those described herein above. Further, the structure, coupling methods and configuration of the system components are provided only for reference and understanding the purpose of the invention. For example, the lengths, widths, heights, angular motion, type of drive units and mechanisms are not limited to those described herein above and are provided only for reference and understanding the purpose of the invention. It will be appreciated that the embodiments may be manufactured with other types of materials and further, the structure and design of the assembly may vary accordingly as well. For example, the system has three different degrees of freedom, all motions are controlled using different drive mechanism, these mechanisms may be replaced, or alternative mechanisms may be used for the similar kind of motion to achieve the same degree of freedom that include, but are not limited to, Hydraulic Systems, Pneumatic Systems, Belt Dive Systems, Chain Drive Systems, AC/DC motors with respective control system It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" is used as the plain-English equivalent of the respective term "comprising" respectively.

Thus, having described the invention, what is claimed is:

1. An article handling system comprising:

a lower frame and an upper frame interconnected by a plurality of scissor lift linkages at a proximal end and a distal end of said lower and upper frames, each said scissor lift linkage having a pivotable first arm and a pivotable second arm, each pivotable arm having a first end and a second end;

a first supporting frame having a plurality of pivotable linking arms for coupling with said plurality of scissor lift linkages, said first supporting frame disposed intermediate said lower and upper frames;

an article bed mounted on a second supporting frame coupled to said upper frame, said article bed having a plurality of multi-directional rollers disposed on oppositely lying sides of said article bed, each said multi-directional roller configured for linear and rotational motion of an article located on said article bed;

a first drive unit mounted on said first supporting frame, configured to translate said article bed interconnected with said plurality of scissor lift linkages and said upper frame, about a longitudinal axis in an upward and a downward translational degree of freedom;

a second drive unit coupled to said article bed, configured to translate said article about an axial feed axis perpendicular to said longitudinal axis of said first drive unit, in a forward and a rearward translational degree of freedom; and a third drive unit coupled to said article bed configured to translate said article bed about an angular pitch axis in a tilting translational degree of freedom, said angular pitch axis orthogonal to a longitudinal axis of said article bed, each said drive units are configured to switch said article handling system mounted on a platform from a retracted position to an extended operating position, thereby stabilizing, translation of said article and ensuring protection to an outer surface of said article.

2. The article handling system as claimed in claim 1, wherein said first drive unit includes a planetary geared bipolar stepper motor coupled to a ball screw linear actuator via an interconnected jaw clutch for transmitting power and translating said article bed in said upwards and downwards translational degree of freedom.

3. The article handling system as claimed in claim 1, wherein said second drive unit includes a planetary geared bipolar stepper motor coupled to a ball screw linear actuator via an interconnected jaw clutch and a chain drive for transmitting power and translating said article in said forward and rearward translational degree of freedom.

4. The article handling system as claimed in claim 1, wherein said third drive unit includes a cubical worm gear screw jack interconnected to a power screwdriver and coupled to said article bed for controlling angular pitch position of the said article bed to about 0 to ±2 tilting translational degree of freedom.

5. The article handling system as claimed in claim 1, wherein said first, second and third drive units are in electrical communication with a control unit mounted off-set to said article handling system or with a handheld controller.

6. The article handling system as claimed in claim 1, wherein said first end or second end of said pivotable first and second arms is slidable along an axial plane within said lower and upper frames when said article handling system is switched from said retracted position to said extended operating position.

7. The article handling system as claimed in claim 1, wherein said first drive unit includes a winch having a rotating handle coupled to said ball screw linear actuator for manually translating said article bed in said upwards and downwards translational degree of freedom, when said jaw clutch is disengaged from said ball screw linear actuator.

8. The article handling system as claimed in claim 1, wherein said second drive unit includes a first hand-wheel coupled to said ball screw linear actuator for manually translating said article in said forward and rearward translational degree of freedom, when said jaw clutch is disengaged from said ball screw linear actuator.

9. The article handling system as claimed in claim 1, wherein said third drive unit includes a second hand-wheel or a torque wrench for coupling to said cubical worm gear screw jack for manually controlling angular pitch position of the said article bed about said tilting translational degree of freedom, when said power screwdriver is disengaged from said cubical worm gear screw jack.

10. The article handling system as claimed in claim 1, wherein a plurality of power supply limit switches are configured to said first, second and third drive units for sensing and locking position of said article within a threshold position during said upwards/downwards, forwards/rearwards, and angular pitch translational degrees of freedom.

11. The article handling system as claimed in claim 1, wherein said lower frame includes a plurality of support legs configured to extend about 130 degrees for stabilizing translation of said article at more than 25 degrees at a roll/pitch condition of said platform.

12. The article handling system as claimed in claim 1, wherein a plurality of suspension members are disposed on said lower frame for receiving absorbing load of the article in said retracted position.

13. The article handling system as claimed in claim 1, wherein a plurality of retraction plates are coupled with said second drive unit to assemble with said article and retract said article onto said article bed with said multi-directional rollers.

14. The article handling system as claimed in claim 5, wherein said control unit or handheld controller includes a user interface, a display interface, memory, a processor or micro-controller, and in real-time is configured to:

regulate power supply from a power source to said article handling system;

invoke a signal indicative of start of operation;

actuate said drive units based on command control signal inputs received from a user finger movement or joystick;

trigger ON/OFF signal indicative of execution of transmitted said command control signals inputs to said drive units;

trigger ON/OFF signal indicative of feedback signals from said power supply limit switches; and enable a user to switch between said control unit or handheld controller.

15. The article handling system as claimed in claim 3, wherein a plurality of retraction plates are coupled with said second drive unit to assemble with said article and retract said article onto said article bed with said multi-directional rollers.

* * * * *